US006188960B1

(12) United States Patent
Baron et al.

(10) Patent No.: US 6,188,960 B1
(45) Date of Patent: *Feb. 13, 2001

(54) SYSTEM AND METHOD FOR PREDICTING STORM DIRECTION

(75) Inventors: Robert O. Baron; Tony L. Benson, both of Huntsville; Tom S. Thompson, Athens, all of AL (US)

(73) Assignee: Baron Services, Inc., Huntsville, AL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/021,449

(22) Filed: Feb. 10, 1998

Related U.S. Application Data

(60) Provisional application No. 60/036,951, filed on Feb. 10, 1997.

(51) Int. Cl.[7] .................................................. G06F 19/00
(52) U.S. Cl. ........................................................ 702/3
(58) Field of Search ............................ 702/3, 4; 342/24, 342/460; 706/931

(56) References Cited

U.S. PATENT DOCUMENTS

| | | |
|---|---|---|
| 4,277,845 | 7/1981 | Smith et al. . |
| 4,347,618 | 8/1982 | Kavouras et al. . |
| 4,402,672 | 9/1983 | Lowe, Jr. . |
| 4,422,037 | 12/1983 | Coleman . |
| 4,506,211 | 3/1985 | Coleman . |
| 4,521,857 | 6/1985 | Reynolds, III . |
| 4,649,388 | 3/1987 | Atlas . |
| 4,712,108 | 12/1987 | Schwab . |
| 5,111,400 | 5/1992 | Yoder . |
| 5,117,359 | 5/1992 | Eccles . |

(List continued on next page.)

OTHER PUBLICATIONS

Forsyth, "Real–Time Forecasting of Echo–Centroid Motion, A Thesis Submitted to the Graduate Faculty, The University of Oklahoma Graduate College," (1979).

Klazura and Imy, "A Description of the Initaial Set of Analysis Products Available from the NEXRAD WSR–88D System," Bulletin of the American Meteorological Society, American Meteorological Society (USA), vol. 74 (No. 7), pp. 1293–1311, (Jul. 1993).

Crum and Alberty, "The WSR–88D and the WSR–88D Operational Support Facility," Bulletin of the American Meteorological Society, American Meteorological Society (USA), vol. 74 (No. 9), pp. 1669–1687, (Sep., 1993).

(List continued on next page.)

*Primary Examiner*—Donald E. McElheny, Jr.
(74) *Attorney, Agent, or Firm*—Lanier, Ford, Shaver & Payne, P.C.; David L. Berdan; Frank M. Caprio

(57) ABSTRACT

The subject invention relates to weather forecasting systems which can predict the direction of a storm's movement. More particularly, the invention will receive and record weather data from any of a variety of weather data sources. The invention will then allow a user to request a storm tracking prediction, and graphically display said prediction with a high degree of accuracy. The weather data is stored in a time-tagged fashion. By storing the weather data in a time-tagged fashion, the weather system constructs an easily accessible weather database containing the locations of storms and other weather phenomena as a function of time. The weather system provides a Graphical User Interface which allows the user to call up a graphical representation of current weather data being supplied to the weather system. The weather system also provides the user with the ability to call up a graphical representation of any of the time-tagged historical weather data stored in the weather database. Then, by invoking some prediction algorithm, such as a linear extrapolation or other similar function, the weather system is able to calculate and display a projection of the selected storm's path from its current location.

13 Claims, 5 Drawing Sheets

U.S. PATENT DOCUMENTS

| | | |
|---|---|---|
| 5,121,430 | 6/1992 | Ganzer et al. . |
| 5,175,551 | 12/1992 | Rubin . |
| 5,208,587 | 5/1993 | Cornman . |
| 5,255,190 | 10/1993 | Sznaider . |
| 5,315,297 | 5/1994 | Cornman . |
| 5,351,045 | 9/1994 | Cornman . |
| 5,359,330 | 10/1994 | Rubin et al. . |
| 5,406,481 * | 4/1995 | Shinozawa et al. ............... 702/3 |
| 5,432,895 | 7/1995 | Myers . |
| 5,490,239 | 2/1996 | Myers . |
| 5,517,193 | 5/1996 | Allison et al. . |
| 5,583,972 | 10/1996 | Miller . |
| 5,596,332 | 1/1997 | Coles et al. . |
| 5,654,886 * | 8/1997 | Zereski, Jr. et al. ............... 702/3 |
| 5,717,589 * | 2/1998 | Thompson et al. ............... 702/3 |
| 5,839,089 * | 11/1998 | Yasuda et al. ............... 702/3 |

OTHER PUBLICATIONS

Dixon and Wiener, "*Titan*: Thunderstorm Identification, Tracking, Analysis, and Nowcasting —A Radar–based Methodology," Journal of Atmospheric and Oceanic Technology, American Meteorological Society (USA), vol. 10 (No. 6), pp. 785–797, (Dec., 1993).

U.S.Department of Commerce, Office of the Federal Coordinator for Meteorological Services and Supporting Research, "Doppler Radar Meteorological Observations, Part A, System Concepts, Responsibilities, and Procedures," Federal Meteorological Handbook No. 11, (Jun., 1991).

Greene and Clark, "Vertically Integrated Liquid Water —A New Analysis Tool," Monthly Weather Review, United States Department of Commerce (USA), vol. 100 (No. 7), pp. 548–552, (Jul. 1972).

Wilk and Gray, "Processing and Analysis Techniques Used With The NSSL Weather Radar System," 14th Radar Meteorology Conference, pp. 369–374, (Nov. 17, 1970).

Bjerkaas and Forsyth, "An Automated Real–Time Storm Analysis and Storm Tracking Program (WEATRK)," Air Force Systems Command, USAF (USA), (Oct. 1, 1980), pp. 1–115.

Johnson, Mackeen, Witt, Mitchell, Stumpf, Eilts, Thomas, "The Storm Cell Identification and Tracking Algorithm: An Enhanced WSR–88D Algorithm," Weather and Forecasting, American Meteorological Society (USA), vol. 13 (No. 2), (Dec. 9, 1997), Abstract only.

Rosenfeld, "Objective Method for Analysis and Tracking of Convective Cells as Seen by Radar," Journal of Atmospheric and Oceanic Technology, American Meteorological Society (USA), pp. 422–434, (Jan. 7, 1987).

Brown and Wood, "On the Interpretation of Single–Doppler Velocity Patterns within Severe Thunderstorms," Weather and Forecasting, American Meterological Society (USA), (Sep. 12, 1990), pp. 32–48.

Brady, Schroeder and Poellot, "Automatic Identification of Tracking of Radar Echoes in Hiplex," Department of Aviation, Univeristy of North Dakota (Grand Forks, ND), pp. 139–143.

Crane, "Automatic Cell Detection and Tracking," IEEE Transactions on Geoscience Electronics, Geoscience Electronics (USA), vol. 17 (No. 4), pp. 250–262, (Oct., 1979).

Davies and Johns, "Some Wind and Instability Parameters Associated With Strong and Violent Tornadoes 1. Wind Shear and Helicity," The Tornado: Its Structure, Dynamics, Prediction, and Hazards, American Geophysical Union (USA), pp. 573–582, (1993).

Sappanos, "New WXAdvisor has Arrived for Triton I7 Triton I7 Release 3.0 Automates Weather Room," On the Front, Kavouras, Inc. (USA), vol. 4 (No. 12), p. 13, (Nov., 1993).

Kavouras, Inc., "It's Breakthrough Time!," NAB brochure, Kavouras, Inc. (USA), (1993), one page.

Baron Services, Inc., "OmniWxSystems," OmniWxSystems sales brochure, Baron Services, iNc. (USA), (Feb. 1, 1994).

Kavouras, Inc., "Storm Tracker Demonstration Program," Kavouras, Inc. (USA),pp. 1–3 (May 11, 1992).

Baron Services, Inc., "Collins Radar, Dramatic New Upgrades," Baron Services, Inc. (USA), (Jul., 1995).

Ciardi and Botner, "Beta Test Plain for Build 9.0," WSR–88D Operational Support Facility (USA), (Jul. 13, 1996).

Operations Training Branch, "Build 9.0 Precursor Training," Operations Training Branch (USA), (Jul. 15, 1996).

Kavouras, Inc., "AutoTrak," Kavouras, Inc. (USA), (1997).

Phillips, Inc., "Time Is On Your Side With NEXRAD Autotrak," On The Front, Kavouras, Inc. (USA), vol. 6 (No. 4), p. 6, (Jul., 1996).

Chenevert, "The WSR–88D Storm Identification and Tracking Algorithms," On The Front, Kavouras, Inc. (USA), vol. 6 (No. 4), p. 5, (Jul., 1996).

* cited by examiner

SYSTEM AND METHOD FOR PREDICTING STORM DIRECTION

DESCRIPTION

This application claims priority from provisional application Ser. No. 60/036,951 filed Feb. 10, 1997 entitled "System and Method For Predicting Storm Direction" which is incorporated herein by reference.

FIELD OF INVENTION

The present invention relates to weather systems which can predict the direction of a storm's movement. More particularly, the present invention will receive and record weather data from any of a variety of weather data sources. The present invention will then allow a user to request a storm tracking prediction, and graphically display said prediction with a high degree of accuracy.

BACKGROUND OF THE INVENTION

In the weather service industry, users of weather data, such as television and radio stations that desire to provide their viewers and listeners, respectively, with state-of-the-art weather forecasting, typically employ systems which receive raw radar data, convert the raw radar data into some form of graphical display allowing a meteorologist or other weather expert to review the weather data.

An emerging technology is the ability to predict the movement of storms. Most current weather forecasting systems allow a user, such as a meteorologist, to manually input historical information on storm locations. Typically, a user would manually input a storm's location over time and the weather system could then generate a prediction of the storm's direction.

Current systems provide a method of storing historical weather data. However, storm tracking and predictions in current systems are achieved by, first, manually gathering storm location information, and, second, manually inputting the storm locations to the weather system, which then performs basically a point-to-point projection.

As can be appreciated, the current systems are labor-intensive and do not provide the user with a simple and intuitive method for predicting the direction of storms. There is a need for a weather system which can provide the user with a method of accurately predicting a storm's path in a few simple steps with as little need for human intervention as possible.

SUMMARY OF THE INVENTION

The present invention makes use of modern computer technology to solve the problems of the current weather systems. It provides a system and method by which the user, typically a meteorologist, can make highly accurate predictions of storm movement in essentially three simple operations.

The present invention provides an improved weather system. This weather system has the capability to receive weather data from any of a multitude of weather sources, such as local weather radar or national weather services. The weather system has the capability to store, in a time-tagged fashion, said weather data. The stored weather data contains information on current weather phenomena such as storms, hail, lightning, etc. The information includes location and time information with respect to the weather phenomena. By storing the weather data in a time-tagged fashion, the weather system constructs an easily accessible weather database containing the locations of storms and other weather phenomena as a function of time.

The weather system provides a Graphical User Interface which allows the user to call up a graphical representation of current weather data being supplied to the weather system. The weather system also provides the user with the ability to call up a graphical representation of any of the time-tagged historical weather data stored in the weather database. The weather system's graphical displays can also be retransmitted to the user's viewers for the purpose of weather forecasting.

In this manner, the present invention provides the user with a weather system that, in normal operation, continually displays the current weather data. Upon request by the user, the weather system can also retrieve historical weather data from the weather database and display said weather data in a graphical fashion. This feature provides an "autotracking" mode of operation wherein the weather system immediately displays to the user in a graphical fashion historical weather data from at least several minutes prior to the time when the autotracking feature was initiated.

From this display of historical weather data, the user can select a storm, through the use of a manual input device, such as a computer mouse or keyboard. The weather system responds to the user's selection by updating the display with a graphical representation of the then-current weather data.

At that point, the user may select the same storm from the then-current weather data display (the storm will be translated some distance from the historical display). Then, by invoking some prediction algorithm, such as a linear extrapolation or other similar function, the weather system is able to calculate and display a projection of the selected storm's path from its current location.

DETAILED DESCRIPTION OF THE INVENTION

Figure 1:
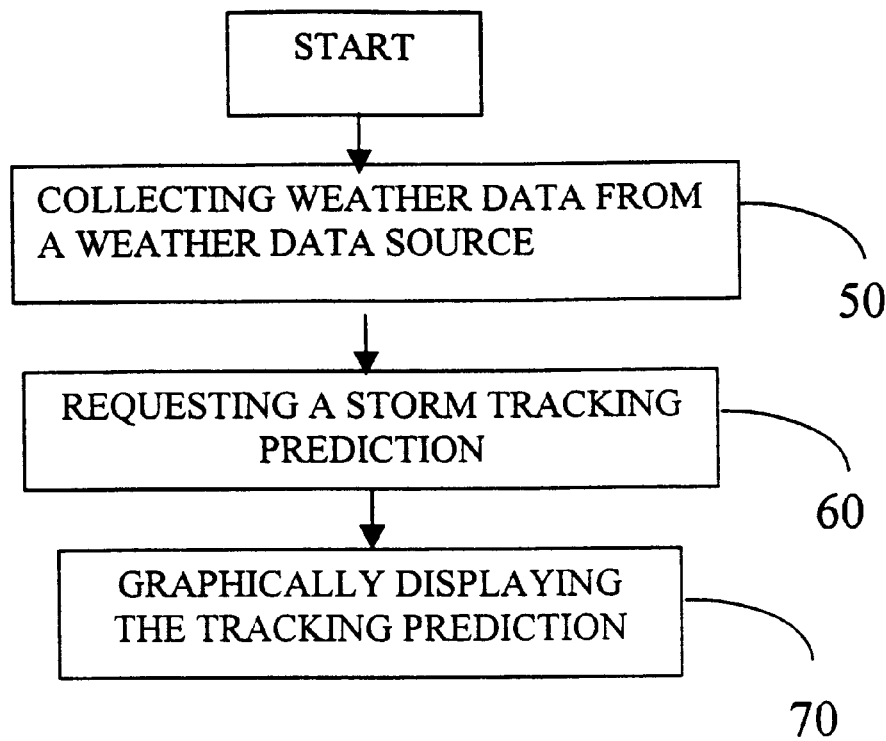
FIG. 1 is a flowchart of the steps of a preferred method of the present invention.
Figure 1A:
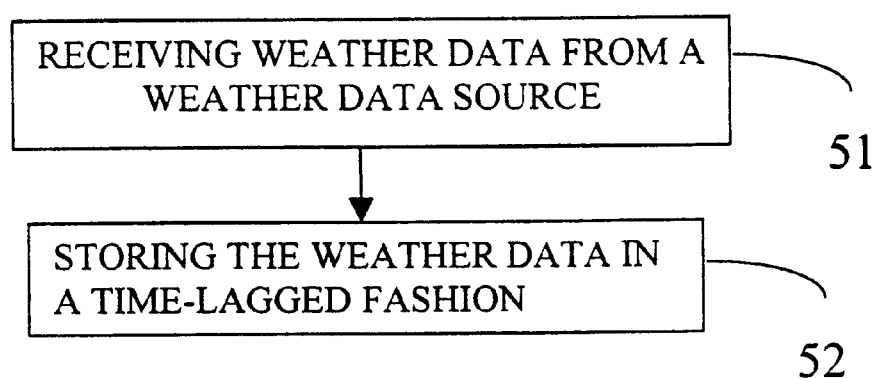
FIG. 1a is a flowchart of the steps included in step 50 of FIG. 1.

Referring now to FIG. 1, the three basic operations of a preferred embodiment of the present invention includes: collecting weather data from a weather data source (step 50); requesting a storm tracking prediction (step 60); and graphically displaying the tracking prediction (70). FIG. 1a further explains step 50. Step 50 includes the steps of receiving the weather data from a weather data source (step 51) such as a local weather radar or national weather service; and storing the weather data in the memory of a computer in at time-tagged fashion (step 52). The storing of the weather data in this fashion constructs an easily accessible weather database containing the location of storms and other weather phenomena as a function of time. This allows for easy retrieval of weather data when needed by a user.

Figure 1B:
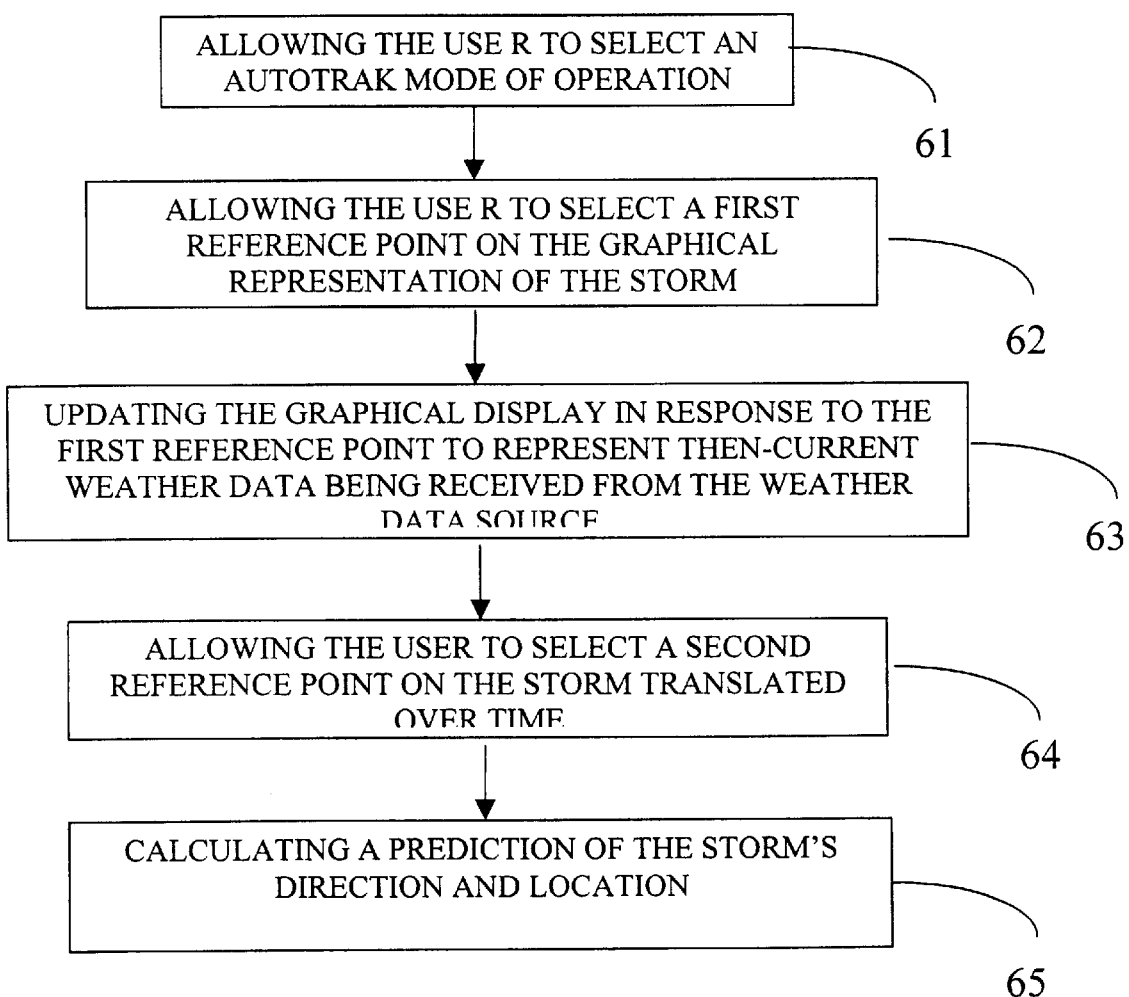
FIG. 1b is a flowchart of the steps included in step 60 of FIG. 1.
Figure 1C:
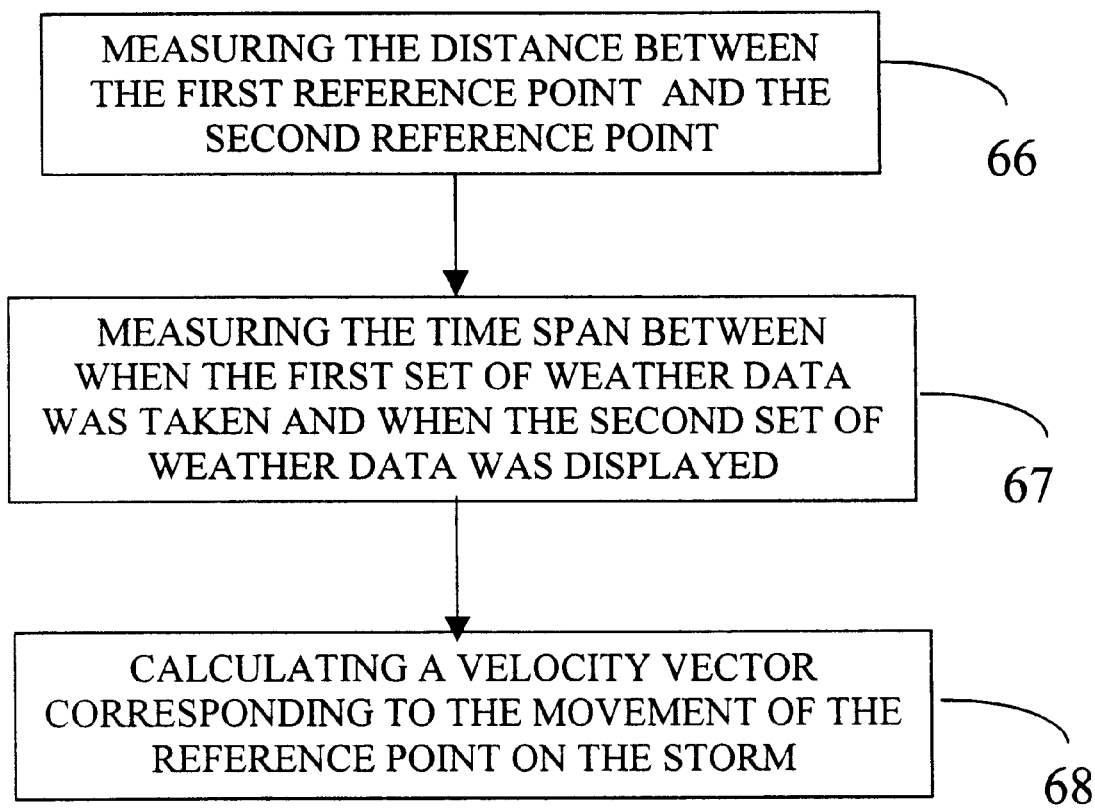
FIG. 1c is a flowchart of the steps included in step 66 of FIG. 1b.
Figure 2:
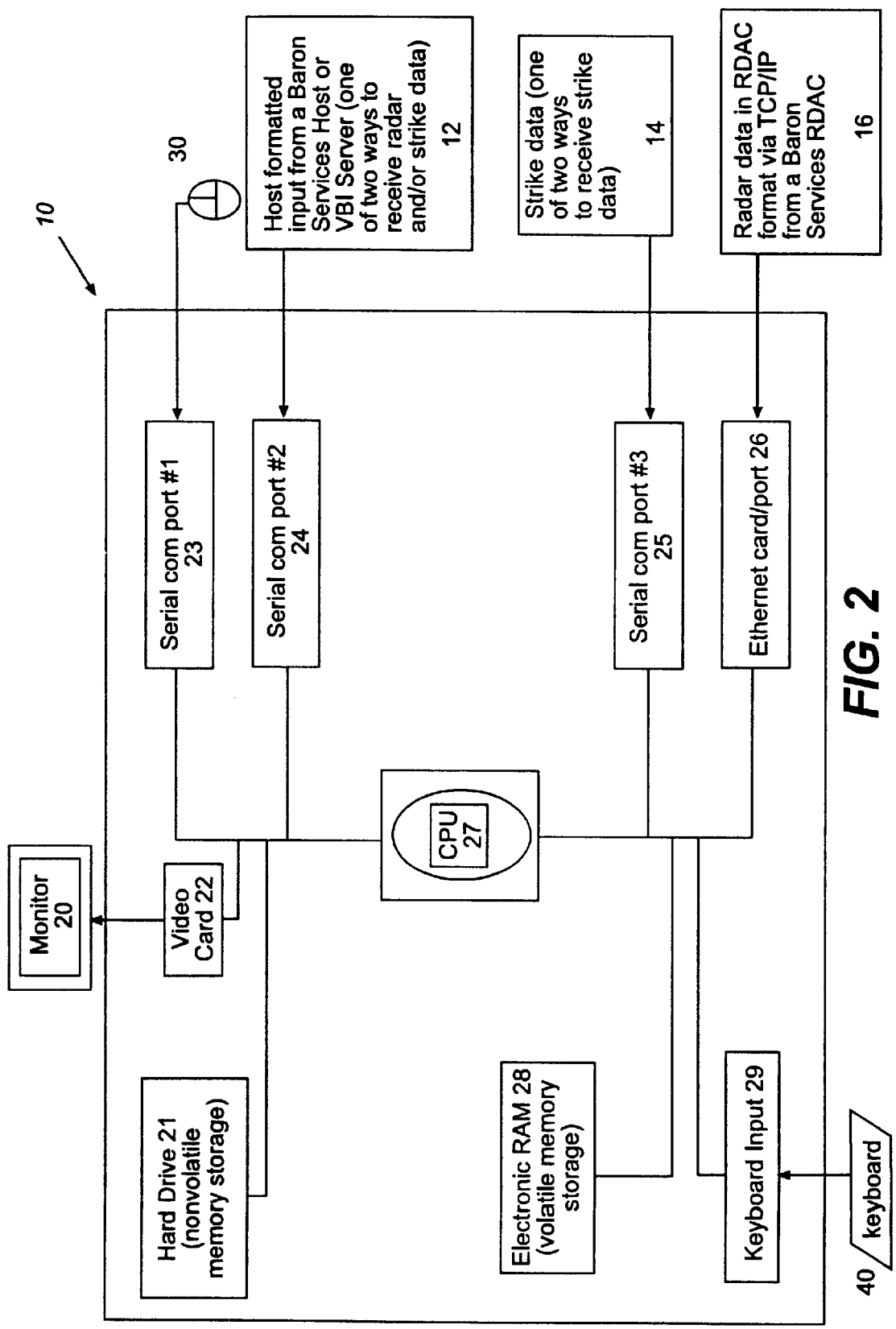
FIG. 2 is a diagram showing the internal devices of a computer for use in the present invention.

As shown in FIG. 1b, step 60 of FIG. 1 includes the steps of allowing the user to select an autotracking mode of operation; rewinding the weather data collected from the weather data source in response to the previous step; allowing the user to select a first reference point on a graphical representation of the storm (the graphical interface which includes monitor 20 and video card 22 is shown in FIG. 2); updating the graphical display in response to the first reference point to represent then-current weather data being received from the weather data source; allowing the user to select a second reference point on the storm translated over time; and calculating a prediction of the storm's direction and location.

These steps allow the user to retrieve historical weather data from the weather database and to display that data in a graphical fashion. Thereafter, the autotracking mode allows the user to begin the storm prediction process. A manual input device such as those shown in FIG. 2, computer mouse 30 or keyboard 40, may be used to select a storm from the graphical display, monitor 20. The system responds to the user's selection by updating the monitor 20 with a graphical representation of the then-current weather data. At that point, the system may display both a historical representation of the selected storm, and the current storm data.

Figure 3:
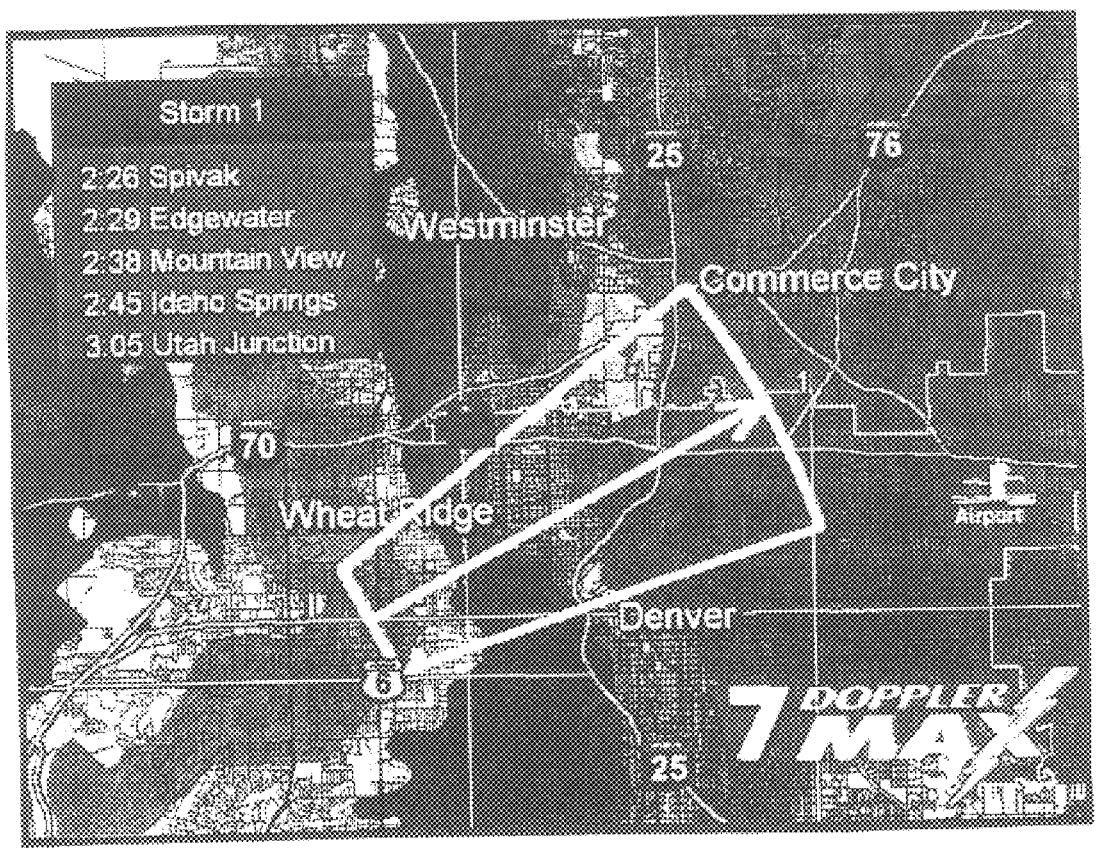
FIG. 3 is a representation of a graphical output of the present invention.

The user may then select a second reference point on the same storm from the current weather data display (the storm will be translated some distance from the historical display). This second reference point may be any point of interest in the storm. Typically, the user will select the center of the storm, but the user may also select the leading or trailing edge of the storm, a section of the storm susceptible to tornado formation, a particularly dense precipitation or hail point, or any other point in the storm cell that the user would like to track. Then, by invoking some prediction algorithm, such as a linear extrapolation or other similar function, the weather system calculates and displays a projection of the selected storm's future path from its current location. This projection can take the form of an arrow, graphically displayed extending from the storm in the direction of the storm's path, representing the storm's speed and direction. The projection can also be graphically displayed in any of a number of other ways, as will be obvious to those skilled in the art. FIG. 3 illustrates a preferred embodiment of the projected storm movement display, including a display of the communities within the storm path, the ETA for each community, and topographical and geographical information.

The weather system of the present invention provides the user with the ability to create a graphical projection of a storm's path, to include direction and speed, in three simple operations. Once the user decides to make a projection of a storm, the user first requests a storm projection; second, selects a storm from the displayed historical weather data; and third, selects the storm from the displayed current weather data.

Thus, the present invention greatly improves over the current systems by simplifying the way in which weather system users, such as meteorologists, can predict and display storm paths for transmission to the user's viewers, listeners or consumers.

It should be understood to those skilled in the art that other modifications and changes can be made without departing from the spirit and scope of the invention and without diminishing its attendant advantages. It is therefore intended that such changes and modifications be covered by the following claims.

We claim:

1. A method of using weather data to graphically display a weather phenomenon's predicted future path, said method comprising the steps of:

a) collecting weather data over a period of time, said weather data corresponding to a weather phenomenon and including a weather phenomenon location and a time, b) associating the weather phenomenon location with geographical information and storing the weather phenomenon location in a computer memory by its time to create a historical weather data database;

c) displaying current collected weather data corresponding to said weather phenomenon as a current graphical representation of said weather phenomenon on a display device together with said geographical information;

d) requesting said historical weather data for a particular time;

e) displaying said historical weather data on said display device as a historical graphical representation of said weather phenomenon;

f) selecting a first reference point on said historical graphical representation of said weather phenomenon with an input device;

g) automatically updating the graphical display in response to said selecting step to display a then current graphical representation of said weather phenomenon;

h) selecting a second reference point on said then current graphical representation of said weather phenomenon;

i) calculating an predicted fixture path of said weather phenomenon; and j) displaying a graphical representation of said predicted future path of said weather phenomenon on said display device.

2. The method of claim 1 wherein said step e) comprises the step of replacing said current graphical representation of said weather phenomenon with said historical graphical representation of said weather phenomenon.

3. The method of claim 1 wherein step i) comprises the steps of:

determining a distance between said first reference point and said second reference point;

determining an elapsed time between receipt of said requested historical weather data and receipt of weather data corresponding to the then current graphical representation of said weather phenomenon; and calculating velocity using said distance and said elapsed time.

4. The method of claim 3 further comprising the steps of selecting a future time of interest and calculating a velocity vector corresponding to said future time of interest via linear extrapolation.

5. The method of claim 4 wherein step j) comprises the step of displaying said velocity vector on said display device.

6. The method of claim 5 further comprising the step of displaying communities in the predicted future path of said weather phenomenon.

7. The method of claim 6 further comprising the step of indicating the estimated time of arrival of said weather phenomenon for each said community.

8. A system using weather data to graphically display a weather phenomenon's predicted future path, said system comprising;

a) at least one communication port for receiving weather data over a period of time, said weather data corresponding to a weather phenomenon and including a weather phenomenon location and a time;

b) a computer memory for storing geographical information and received weather data, said received weather data stored in said computer memory comprising historical weather data;

c) a CPU communicating with said at least one communication port and said computer memory to associate said weather data with said geographical data and to store said weather data by time;

c) a display device communicating with said CPU to graphically display said geographical information and current received weather data corresponding to said weather phenomenon;

d) an input device communicating with said CPU and said display device to select said historical weather data for a particular time at the request of a user, wherein said display device displays a historical graphical representation of said weather phenomenon for that particular time, and to select a first reference point on said historical graphical representation at the request of a user, wherein said CPU automatically updates the graphical display depicted on said display device to display a then current graphical representation of said weather phenomenon, and to select a second reference point on said then current graphical representation of said weather phenomenon at the request of a user, whereby said CPU calculates an expected future path of said weather phenomenon, and whereby said display device displays a graphical representation of said expected future path of said weather phenomenon.

9. The system of claim 8 wherein said CPU calculates a distance between said first reference point and said second reference point, and calculates an elapsed time between receipt of said requested historical weather data and receipt of weather data corresponding to the then current graphical representation of said weather phenomenon, and thereafter, calculates velocity using said distance and said elapsed time.

10. The system of claim 9 wherein said CPU calculates a velocity vector via linear extrapolation, said velocity vector corresponding to a future time of interest selected by a user.

11. The system of claim 10 wherein said velocity vector is displayed on said display device.

12. The system of claim 11 wherein said CPU determines communities in the path of the predicted future path of said weather phenomenon.

13. The system of claim 12 wherein said CPU calculates an estimated time of arrival of said weather phenomenon for each said community.

\* \* \* \* \*